United States Patent [19]

Kerecman

[11] Patent Number: 4,887,989
[45] Date of Patent: Dec. 19, 1989

[54] DYNAMICALLY BALANCED DRIVESHAFT AND METHOD OF PRODUCING THE SAME

[75] Inventor: Norman C. Kerecman, West Bend, Wis.

[73] Assignee: A. O. Smith Corporation, Milwaukee, Wis.

[21] Appl. No.: 138,801

[22] Filed: Dec. 28, 1987

[51] Int. Cl.[4] .............................................. F16F 15/32
[52] U.S. Cl. .................................. 464/180; 74/573 R
[58] Field of Search ..................... 29/402.09, 526 A; 73/468; 74/573 R; 464/179, 180, 181, 183, 185

[56] References Cited

U.S. PATENT DOCUMENTS

| | | | |
|---|---|---|---|
| 3,074,293 | 1/1963 | Langsetmo | 464/180 X |
| 3,783,522 | 1/1974 | Dodd | 33/181 |
| 4,170,896 | 10/1979 | Korkosz | 73/468 X |
| 4,400,037 | 8/1983 | Gentry | 74/573 R X |

FOREIGN PATENT DOCUMENTS

| | | | |
|---|---|---|---|
| 3035437 | 5/1982 | Fed. Rep. of Germany | 74/573 R |
| 3140368 | 1/1983 | Fed. Rep. of Germany | 464/180 |
| 2041159 | 9/1980 | United Kingdom | 74/573 R |
| 2119063 | 11/1983 | United Kingdom | 464/180 |
| 2147388 | 5/1985 | United Kingdom | 74/573 R |

*Primary Examiner*—Daniel P. Stodola
*Attorney, Agent, or Firm*—Andrus, Sceales, Starke & Sawall

[57] ABSTRACT

A dynamically balanced tubular shaft. To balance the shaft, a small weight is secured to one or more locations of imbalance on the shaft by a mechanical fastener, such as a blind hole rivet. The shaft and the weight are provided with aligned openings and the rivet is inserted through the openings from the exterior of the shaft and the inner end of the rivet is upset to provide a mechanical connection between the weight and the shaft. A layer of adhesive can be interposed between the weight and the shaft to bond and seal the weight to the outer surface of the shaft.

5 Claims, 1 Drawing Sheet

DYNAMICALLY BALANCED DRIVESHAFT AND METHOD OF PRODUCING THE SAME

BACKGROUND OF THE INVENTION

It is recognized tha commercially produced drive shafts, such as vehicle drive shafts are not uniformly cylindrical in cross section and are not absolutely straight throughout their length. In addition, the shaft may have irregularities in wall thickness. These irregularities in geometry and material result in incongruent mass and rotation centers, causing eccentric loading imbalance. This imbalance can cause excessive bearing loads during service and the bearing loads are aggravated by consequent whirling or whipping of the shaft caused by the unbalanced mass of distribution.

With steel shafts, the practice has been to balance the shaft by welding small weights at the end of the shaft. Small balance weights are attached to the yoke sleeve area at the ends of the drive shaft, because welding of the weights to the thin wall tube can cause thermally induced distortions, resulting in bowing of the shaft that can cause an additional imbalance.

With composite drive shafts, such as those formed of fiber reinforced resin, weights cannot be welded to the shaft and thus the shaft must be balanced by other means.

U.S. Pat. No. 4,170,896 describes a method of balancing a high speed propeller shaft through the use of self-adhering aluminum tape. In accordance with the procedure described in that patent, the imbalance is measured at a multiplicity of stations along the length of the shaft and the aluminum tape is applied as a continuous strip in a generally zig-zag pattern along with the length of the shaft to balance the shaft.

SUMMARY OF THE INVENTION

The invention is directed to a dynamically balanced tubular drive shaft assembly and to a method of producing the same. The tubular shaft, which can be composed of either metal or composite materials, is designed, in general, for operation below the first critical speed. In accordance with the invention, a small weight formed of metal, or other high density material, is secured to one or more spaced locations on the shaft by a mechanical fastener, such as a rivet, to thereby dynamically balance the shaft.

In practice, the weight, which can be formed of steel, generally has a thickness less than ¼ inch, and an area less than 2 sq. inches. The weight can be curved to conform to the cylindrical contour of the shaft.

Both the shaft and the weight are provided with aligned openings and the head of a self-sealing blind hole rivet or fastener is inserted through the aligned openings from the outside of the shaft and the inner end of the rivet is upset to provide a mechanical connection between the weight and the shaft.

In addition, a layer of an adhesive sealant, can be interposed between the weight and the outer surface of the shaft to bond the weight to the shaft and seal the interface therebetween.

The invention provides a rapid and effective method of balancing either metal or composite drive shafts. By utilizing the method of the invention with steel or metal drive shafts, the welding of weights to the shaft is eliminated with the result that expensive welding equipment is not required and heat distortion that can result from welding is eliminated.

The use of the adhesive increases the area of attachment of the weight to the shaft and thereby minimizes stress concentrations in the area of the weight. The adhesive also provides a seal to prevent the possibility of water or other liquid leaking through the hole to the interior of the shaft, which could cause imbalance of the shaft.

Other objects and advantages will appear in the course of the following description.

DESCRIPTION OF THE DRAWINGS

The drawings illustrate the best mode presently contemplated by carrying out the invention.

In the drawings.

DESCRIPTION OF THE ILLUSTRATED EMBODIMENT

Figure 1:
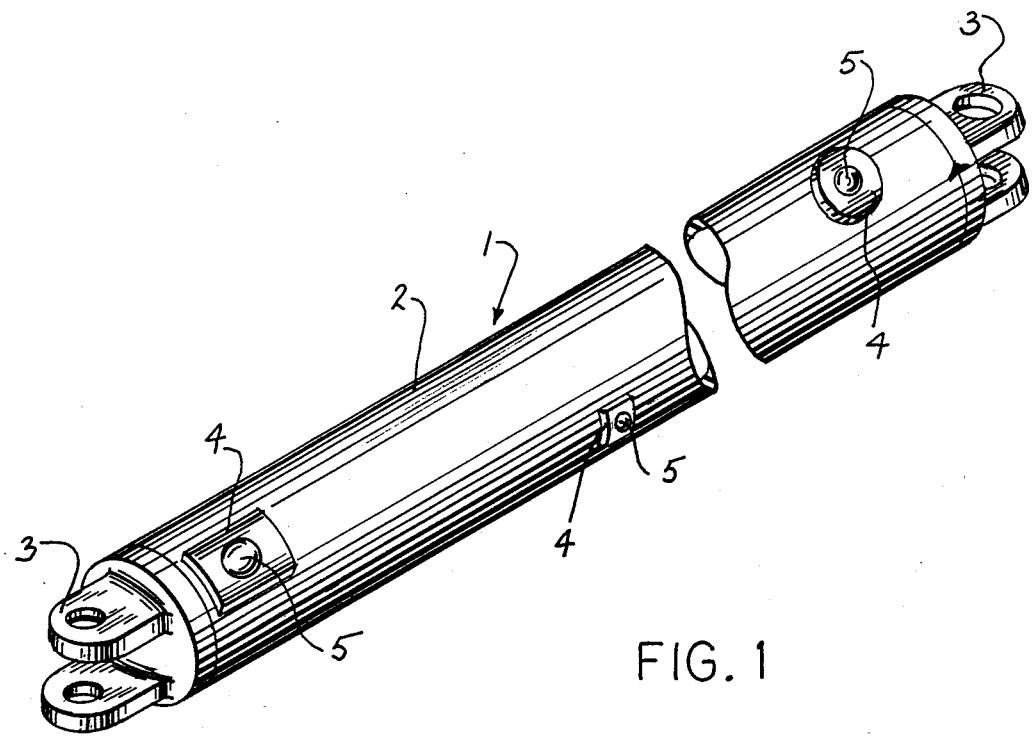
FIG. 1 is a perspective view of a drive shaft balanced in accordance with the invention.
Figure 2:
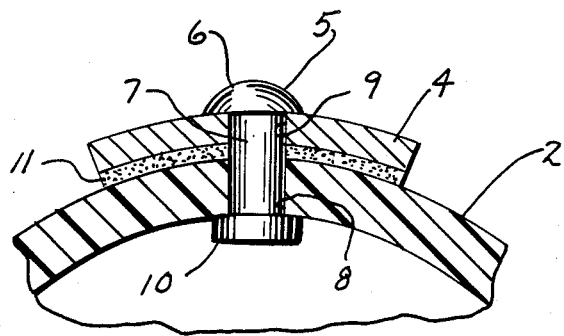
FIG. 2 is an enlarged fragmentary transverse section of the drive shaft showing the attachment of the weight to the shaft.

FIGS. 1 and 2 show a drive shaft assembly 1 composed of a shaft 2 and end yokes 3, which has been balanced through the application of a plurality of small weights 4 that are attached to the shaft by rivets 5, or other mechanical fasteners. The invention has particular application to a vehicle drive shaft having a length in the range of about 6 ft. and which is adapted to operate at speeds below the first critical speeds. In general, such a shaft will operate at speeds below 6,000 rpm and generally in the range of 0 to 3,000 rpm.

Shaft 2 is tubular and can be formed of a metal, such as steel, or alternately can be formed from a composite material, such as fiber reinforced resin. If formed of fiber reinforced resin, shaft 2 is normally composed of substantially continuous fibers of a material, such as glass or graphite, which are wound in a number of superimposed layers to form the shaft. Various winding patterns can be employed, as is conventional, with the fibers being disposed at any desired helix angle.

In a composite shaft, the fibrous material is bonded by a thermosetting resin, such as an epoxy or a polyester resin.

The balancing weights 4 are preferably formed of a high density metal, and generally have a thickness less than ¼ inch, an area less than 2 sq. inches and a density between 0.1 to 0.3 per cu. inch. The weights 4 can be curved, as shown in FIG. 2, to conform to the cylindrical configuration of shaft 2. The weights 4 can have various configurations, i.e. square, oval, circular, etc.

Rivet 5, preferably a standard blind hole rivet, is composed of a head 6, which is located on the outside of shaft 2 and a stem 7, which extends through aligned openings 8 and 9 in the shaft 2 and weight 4, respectively. The inner end of rivet 5 is upset, as indicated by 10, to provide a mechanical connection between weight 4 and shaft 2.

In addition, a layer of an adhesive sealant 11 is interposed between weight 4 and the outer surface of shaft 2. The adhesive 11 can take the form of an epoxy adhesive, a urethane based adhesive, a polymerized elastomer, a cyanoacrylate adhesive, double-coated pressure sensitive tape, or the like. The layer 11 serves to bond the inner surface of the weight to the shaft 2 and provides a seal to prevent water, or other material, from leaking through hole 8 into the interior of the shaft. Any accumulation of moisture or other material inside of the shaft can cause imbalance of the shaft during service. The adhesive layer also increases the area of contact between the weight and the shaft to thereby distribute the stress over a greater area and prevent stress concentrations in the area of the rivet 5.

In certain instances, weights 4 may be applied only to one or both ends of shaft 2, while in other instances, as shown in FIG. 1, weights 4 are not only attached to the ends of the shaft but a weight is also attached to the central portion of the shaft.

While the drawings have illustrated the weight being attached to the shaft 2 through use of a rivet 5, it is contemplated that other mechanical fasteners can be substituted for rivet 5.

In the balancing procedure, shaft assembly 1, including shaft 2 and attached yokes 3, is initially rotated on a balancing machine in a conventional manner to determine the locations of imbalance. One or more holes 8 are then drilled in the shaft at the locations where weights 4 are to be applied and the area of the shaft surrounding each hole 8 is then cleaned with a suitable solvent. The adhesive 11 is then applied to the undersurface of weight 4, and the weight is applied to the shaft with the holes 8 and 9 in alignment. The blind hole rivet 5 is then inserted through the aligned holes with the head 6 of the rivet bearing against the outer surface of the weight 4. The inner end of the rivet is then upset in a conventional manner to provide the mechanical connection between the weight 4 and shaft 2.

The adhesive layer not only serves to seal the joint between the weight 4 and the shaft 2, but also firmly bonds the weight to the shaft to prevent rattling of the weight in the event that the riveted connection should loosen in service. In balancing the shaft, the weight of the rivet 5 along with the weight 4 itself, must be taken into consideration.

As the shaft is normally overdesigned in elastic modulus, the hole 8 formed in the shaft provides an insignificant reduction in the modulus, so that it will not adversely effect the mechanical properties of the shaft.

The invention provides a rapid and effective manner of precisely balancing a tubular member or drive shaft.

The invention can be utilized with both metal and composite drive shafts and when dealing with metal shafts it eliminates the conventional welding process, as used in the past, and the resulting disadvantages in heat distortion that can accompany a welding process.

Various modes of carrying out the invention are contemplated as being within the scope of the following claims particularly pointing out and distinctly claiming the subject matter which is regarded as the invention.

I claim:

1. A balanced shaft assembly, comprising a tubular shaft, at least one weight engaged with the outer surface of said shaft and disposed at a location to dynamically balance said shaft, said weight being curved to conform to the shape of the shaft and having a thickness less than ¼ inch, said shaft and said weight having aligned openings, a mechanical fastener extending through said openings for securing said weight to said shaft, and sealing means disposed between said weight and said shaft for sealing the opening in said shaft.

2. The assembly of claim 1, wherein said weight has a density in the range of 0.1 to 0.3 lbs. per cu. inch.

3. The assembly of claim 1, wherein said fastener is a rivet.

4. A balanced shaft assembly, comprising a tubular shaft, a weight applied to said shaft, said shaft and said weight having aligned openings, a rivet having a head disposed on the outer surface of said weight and having a stem extending through said aligned openings, the inner end of said rivet being upset to provide a mechanical connection between the weight and said shaft, and a layer of adhesive disposed between said weight and the outer surface of said shaft.

5. A balanced drive shaft assembly, comprising a tubular shaft, a yoke secured to each end of the shaft, at least one weight applied to said shaft, said shaft and said weight having aligned openings, said weight being curved to conform to the shape of said shaft and having a thickness less than ¼ inch and an area less than 2 sq. inches, a layer of adhesive disposed between said weight and the outer surface of said shaft, and a blind hole rivet extending through said aligned openings and securing said weight to said shaft.

* * * * *